US012047739B2

(12) United States Patent
Groestad et al.

(10) Patent No.: US 12,047,739 B2
(45) Date of Patent: Jul. 23, 2024

(54) STEREO SOUND GENERATION USING MICROPHONE AND/OR FACE DETECTION

(71) Applicant: Cisco Technology, Inc., San Jose, CA (US)

(72) Inventors: Sindre Groestad, Oslo (NO); Ragnvald Balch Barth, Oslo (NO); Lennart Burenius, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 134 days.

(21) Appl. No.: 17/829,751

(22) Filed: Jun. 1, 2022

(65) Prior Publication Data

US 2023/0396918 A1     Dec. 7, 2023

(51) Int. Cl.
| | |
|---|---|
| H04R 5/00 | (2006.01) |
| G06T 7/70 | (2017.01) |
| H04L 12/18 | (2006.01) |
| H04R 1/40 | (2006.01) |
| H04R 3/00 | (2006.01) |
| H04R 5/04 | (2006.01) |
| H04S 1/00 | (2006.01) |
| H04S 7/00 | (2006.01) |

(52) U.S. Cl.
CPC ............... *H04R 1/406* (2013.01); *G06T 7/70* (2017.01); *H04L 12/1822* (2013.01); *H04R 3/005* (2013.01); *H04R 5/04* (2013.01); *H04S 1/002* (2013.01); *H04S 7/30* (2013.01); *G06T 2207/30201* (2013.01); *H04S 2400/15* (2013.01)

(58) Field of Classification Search
CPC .................... H04R 3/005; H04R 1/406; H04R 2201/401; H04R 2430/01; G06T 7/70; G06T 2207/30196; G10L 17/02; G10L 17/06; H04L 65/4038

USPC ...................................... 381/92, 122, 17, 18
See application file for complete search history.

(56) References Cited

U.S. PATENT DOCUMENTS

| | | | |
|---|---|---|---|
| 8,509,454 | B2 | 8/2013 | Kirkeby et al. |
| 8,842,161 | B2 | 9/2014 | Feng et al. |
| 8,855,341 | B2 | 10/2014 | Kim et al. |
| 9,129,515 | B2 | 9/2015 | Xiang et al. |

(Continued)

FOREIGN PATENT DOCUMENTS

EP        2874412 A1     5/2015

OTHER PUBLICATIONS

Wei, et al., "Estimating Angles of Arrival (AoA) of Multiple Echoes in a Steering Vector Space," https://arxiv.org/ abs/2109.13072, Sep. 27, 2021, 14 pages.

(Continued)

*Primary Examiner* — Ammar T Hamid
(74) *Attorney, Agent, or Firm* — Edell, Shapiro & Finnan, LLC

(57) ABSTRACT

Presented herein are techniques to generate a stereo sound signal based on direction of arrival of sound signals. A method includes receiving sound signals at a microphone, outputting a mono sound signal from the microphone, determining a direction of arrival of the sound signals with respect to the microphone, generating, from the mono audio signal, a stereo sound signal having a first channel and a second channel, wherein an amplitude of the first channel and an amplitude of the second channel are weighted, respectively, based on the direction of arrival of the sound signals at the microphone.

20 Claims, 6 Drawing Sheets

(56) References Cited

U.S. PATENT DOCUMENTS

| | | | |
|---|---|---|---|
| 9,210,499 | B2 | 12/2015 | Sun et al. |
| 9,420,386 | B2 | 8/2016 | Rass |
| 9,491,405 | B2 | 11/2016 | Zhou et al. |
| 9,560,445 | B2 | 1/2017 | Raghuvanshi et al. |
| 9,674,453 | B1* | 6/2017 | Tangeland ........... H04N 23/661 |
| 2010/0328419 | A1 | 12/2010 | Etter et al. |
| 2015/0221319 | A1 | 8/2015 | Cartwright et al. |
| 2015/0271593 | A1 | 9/2015 | Sun et al. |
| 2015/0288824 | A1 | 10/2015 | Quiers et al. |
| 2017/0201825 | A1 | 7/2017 | Whyte et al. |
| 2018/0070053 | A1 | 3/2018 | Feng et al. |
| 2019/0230436 | A1 | 7/2019 | Tsingos et al. |
| 2021/0136505 | A1* | 5/2021 | Burenius ................ H04R 3/005 |
| 2022/0030113 | A1 | 1/2022 | Hansen et al. |

OTHER PUBLICATIONS

De Bruijn, "Application of Wave Field Synthesis in Videoconferencing," TU Delft, Delft University of Technology, Oct. 2004, 272 pages.

Eskow, "The Art of Audio Mixing for Sports," TvTechnology, http://www.tvtechnolocy.com/news/0002/the-art-of-audio-mixing-for-sports/277456, Nov. 18, 2015, 3 pages.

Herre, et al., "MPEG-H Audio—The New Standard for Universal Spatial/3D Audio Coding," Journal of the Audio Engineering Society, vol. 62, No. 12, Dec. 2014, 12 pages.

Winsvold, et al., "Advanced Headset Tracking for Optimized User Experience With Directional Audio," Technical Disclosure Commons, https://www.tdcommons.org/dpubs_series/3470, Jul. 30, 2020, 7 pages.

* cited by examiner

STEREO SOUND GENERATION USING MICROPHONE AND/OR FACE DETECTION

TECHNICAL FIELD

The present disclosure relates to enhancing audio quality during a videoconference.

BACKGROUND

A video endpoint is an electronic device that enables a user to engage in a teleconference with one or more remote users, often via one or more teleconferencing servers and additional video endpoints. A video endpoint may include various components to help facilitate a session or teleconference, including one or more cameras, loudspeakers, microphones, displays, etc. Video endpoints are often utilized in professional settings (e.g., enterprise deployments), although they have recently found increased use in home environments as well.

When talking to people in real life, the source of the sound (i.e., the direction from which the sound originates) helps with intelligibility and with identifying who is talking. When in a video conference (especially enterprise video conference systems), "directional audio" helps replicate this experience by playing the relevant audio from a position corresponding to the video frame with which the audio is associated. However, directional audio of this sort only distinguishes among different video frames. If a person is moving inside a video frame or if there are multiple people calling from a same endpoint (and thus shown at the remote end in a single video frame), the audio will still appear to be coming from the same location, no matter where in the video frame the person who is talking is located, thus decreasing intelligibility and the ability to easily discern who might be talking at a given moment.

DESCRIPTION OF EXAMPLE EMBODIMENTS

Overview

Figure 1:
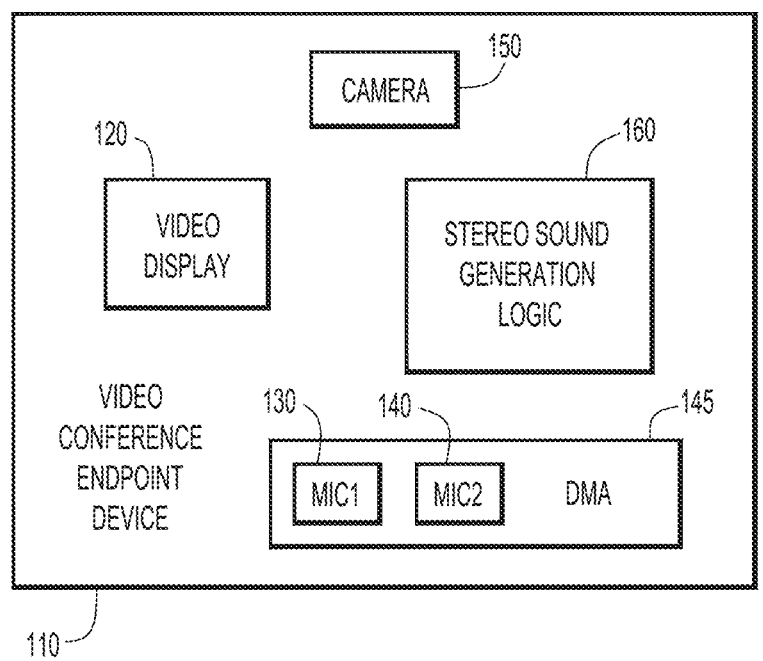
FIG. 1 depicts a video conference endpoint device including stereo sound generation logic, according to an example embodiment.

Presented herein are techniques to generate a stereo sound signal based on direction of arrival of sound signals. A method includes receiving sound signals at a microphone, outputting a mono sound signal from the microphone, determining a direction of arrival of the sound signals with respect to the microphone, generating, from the mono sound signal, a stereo sound signal having a first channel and a second channel, wherein an amplitude of the first channel and an amplitude of the second channel are weighted, respectively, based on the direction of arrival of the sound signals at the microphone.

In another embodiment, a device is provided. The device includes an interface configured to enable network communications, a memory, and one or more processors coupled to the interface and the memory, and configured to: receive sound signals at a microphone, output a mono sound signal from the microphone, determine a direction of arrival of the sound signals with respect to the microphone, and generate, from the mono sound signal, a stereo sound signal having a first channel and a second channel, wherein an amplitude of the first channel and an amplitude of the second channel are weighted, respectively, based on the direction of arrival of the sound signals at the microphone.

EXAMPLE EMBODIMENTS

Using a microphone array, such as a dual microphone array, it is possible to calculate the direction of arrival (DOA) of different frequencies of sound waves and attenuate selected frequencies arriving from undesired directions. For example, the sound of a person talking will have a certain frequency envelop or profile, while the sound of a barking dog will have a different frequency envelop or profile. If the sounds are coming from different directions, the microphone array, and logic associated therewith, can attenuate, using appropriate filters, the sound of the barking dog and only allow the sound of the person talking to pass through to a remote endpoint device. Such an approach may be implemented in a video conferencing device, and used to attenuate noise originating from the sides of the video conferencing device, while preserving the voice of a user located directly in front of the video conferencing device. However, a user may not necessarily be seated directly in front of the video conferencing device. And, further, the user could be moving around while talking. Thus, in accordance with embodiments described herein, scenarios, beyond those in which the user is merely sitting directly in front of the video conferencing device (with noise to the sides), are supported such that the user, or users, can still properly be heard in a more natural way and, in particular, using stereo sound signals during the course of a video conference.

Automated face-detection is now possible using, e.g., machine-learning techniques. In accordance with an embodiment, face detection may be used to detect where the user and/or other people are located relative to the video conferencing device. Face detection information, in the form of, e.g., angle(s), distance, and/or pose, with respect to the video conferencing device may then be leveraged to configure a microphone array with optimized beam forming properties, and may further be used to generate stereo sounds signals.

And, as will be explained in more detail below, face detection information by itself, i.e., even without the use of DOA of sound signals, may also be leveraged to generate a stereo sound signal that may be transmitted to a remote video conference endpoint.

Reference is now made to the several figures, beginning with FIG. 1, which depicts a video conference endpoint device 110 including stereo sound generation logic 160, according to an example embodiment. As shown, video conference endpoint device 110 includes a video display 120, a first microphone (MIC1) 130, and a second microphone (MIC2) 140. MIC1 130 and MIC2 140 may be part of a dual-microphone array (DMA) 145. Also shown are a camera 150, and stereo sound generation logic 160. In some embodiments, DMA 145 may be replaced with a single mono microphone, or with a microphone array having more than two microphones. Video conference endpoint device 110, and any logic hosted thereby, may be implemented by an electronic or computing device 700 described further below with respect to FIG. 7.

Figure 2A:
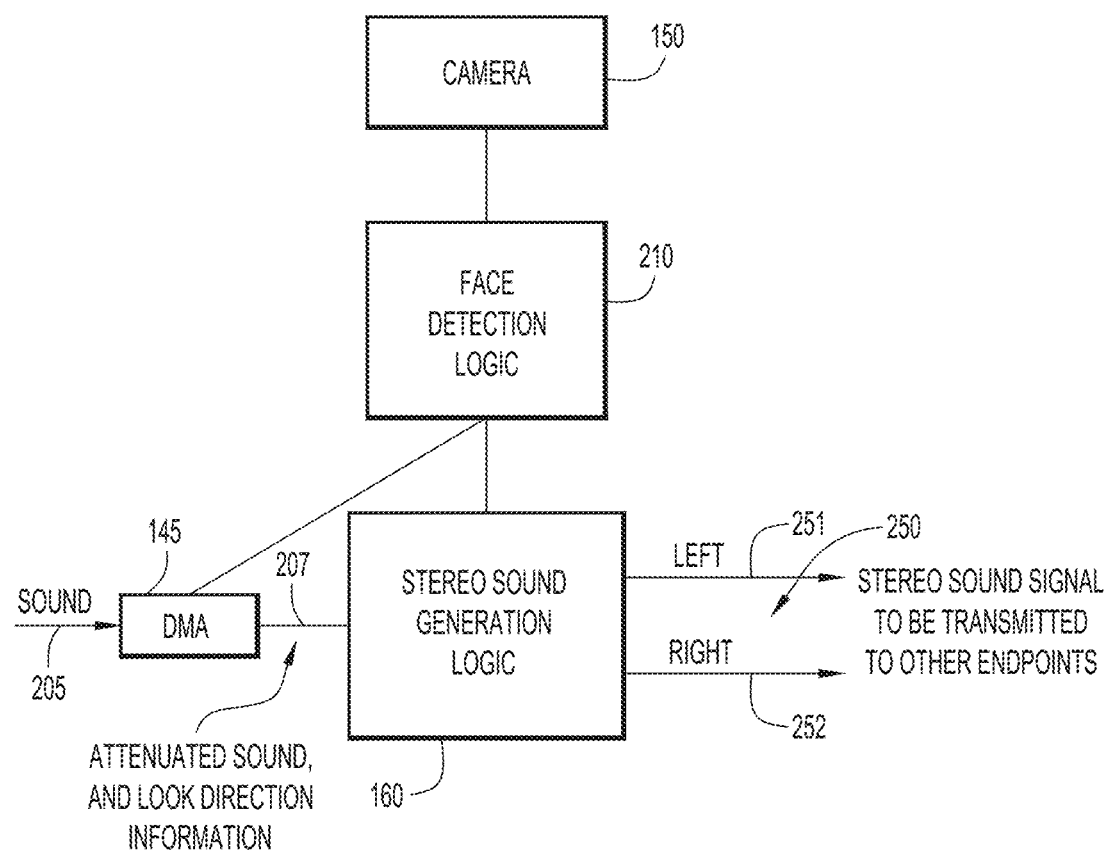
FIG. 2A is a block diagram of elements from which stereo sound generation logic receives information that is used to generate stereo audio signals, according to an example embodiment.

FIG. 2A is a block diagram of elements from which stereo sound generation logic 160 receives information that is used to generate a stereo sound signal 250, according to an example embodiment. As shown in the figure, sound 205 is picked up by DMA 145 (or a single or multi-microphone array), and associated logic determines from where sounds are emanating. Microphone beam forming operations may be conducted in accordance with the scheme described, e.g., in U.S. Pat. No. 9,210,499. The ultimate direction of a given beam, using appropriately selected filter coefficients, may be considered to be a "look direction" of DMA 145. These look directions can be based on face detection and form one or multiple beams attenuating sound coming from outside of the respective beam. Thus, as shown in the figure, attenuated sounds and look directions information (e.g., angles) are supplied to stereo sound generation logic 160.

At the same time, camera 150 feeds images of its field of view to face detection logic 210, which may operate, using, e.g., a machine learning model, to identify faces in the field of view of camera 150. Face detection logic 210 is configured to identify the location or position (e.g., angle, distance) of any identified face(s) with respect to camera 150, and therefore also with respect to video conference endpoint device 110. Further, face detection logic 210 may be configured to determine a "pose" of a given detected face. That is, face detection logic 210 may be configured to determine whether a given detected face is looking straight toward video conference endpoint device 110, or is, instead, looking away from video conference endpoint device 110. Thus, information regarding presence of a face, the angle and distance of the face from video conference endpoint device 110, and a pose of a detected face may be provided to stereo sound generation logic 160. With this information, stereo sound generation logic 160 is configured to generate an appropriate stereo sound signal 250 comprising a left channel 251 and a right channel 252 that is then transmitted to other endpoints (not shown), as will be explained in more detail below.

Figure 2B:
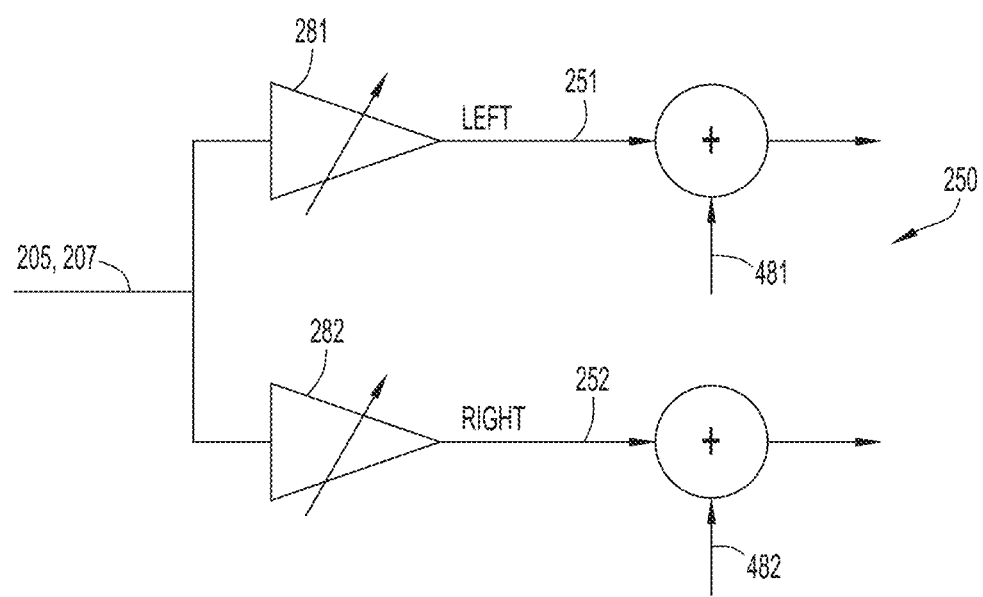
FIG. 2B shows an example electronic circuit for generating a stereo sound signal, according to an example embodiment.

FIG. 2B shows an example electronic circuit for generating a stereo sound signal, according to an example embodiment. In one possible implementation, sound 205 or attenuated sound 207 is supplied to variable gain amplifiers 281, 282 that generate left channel 251 and right channel 252 sound signals. The respective gains of variable gain amplifiers 281, 282 are controlled by stereo sound generation logic 160 based on at least one of information regarding presence of a face, the angle and distance of the face from video conference endpoint device 110, the pose of a detected face provided by face detection logic 210, and/or look direction information provided by DMA 145. Those skilled in the art will appreciate that variable gain amplifiers may be implemented as analog or digital circuitry, or a combination thereof.

Figure 3:
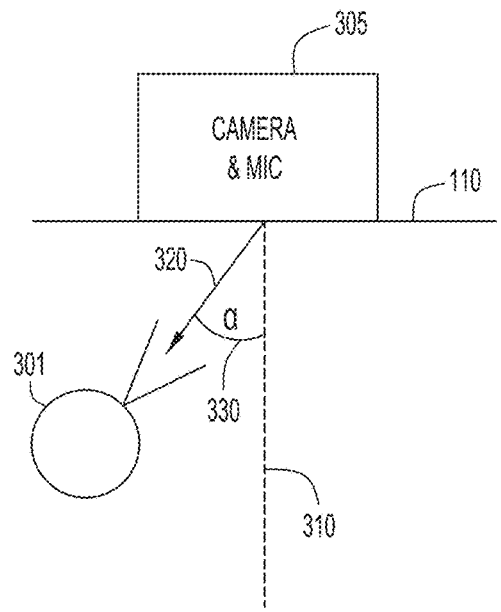
FIG. 3 shows a scenario in which stereo sound generation logic uses face detection information to generate a stereo audio signal from a microphone picking up sound from a participant, according to an example embodiment.

FIG. 3 shows a scenario in which stereo sound generation logic 160 uses face detection information to generate a stereo sound signal from a microphone picking up sound from a participant 301, according to an example embodiment. Specifically, the instant scenario may be limited to only one participant 301 in front of a combination camera and microphone 305. In this embodiment, DMA processing may not be employed to obtain a stereo sound signal. As shown, participant 301 is located at an angle α 330 from an imaginary normal line 310 that extends outward from combination camera and microphone 305 of video conference endpoint device 110. That is, a view direction 320 may be determined and adjusted by face detection logic 210 and supplied to stereo sound generation logic 160.

Angle α 330 or view direction 320 is used by stereo sound generation logic 160 to manipulate a mono audio signal from a microphone, such as from the microphone in combination camera and microphone 305, into a stereo sound signal. For example, if angle α 330 suggests participant 301 is sitting far to the left of video conference endpoint device 110, stereo sound generation logic 160 may be configured to weigh the mono audio signal more in the left channel 251 than in the right channel 252 by increasing the gain of variable gain amplifier 281 with respect to the gain of variable gain amplifier 282. In the scenario of FIG. 3, a microphone in combination camera and microphone 305 may be a single mono microphone, or a multi-microphone array (which may output a mono signal).

It is noted that, in the above scenario, if there are multiple participants in front of video conference endpoint device 110 it is not possible to balance separate voices in the stereo sound signal 250 without the benefit of a multi-microphone array, such as DMA 145. Leveraging DMA 145 for multiple participants to generate a stereo sound signal is described next in connection with FIG. 4.

Figure 4:
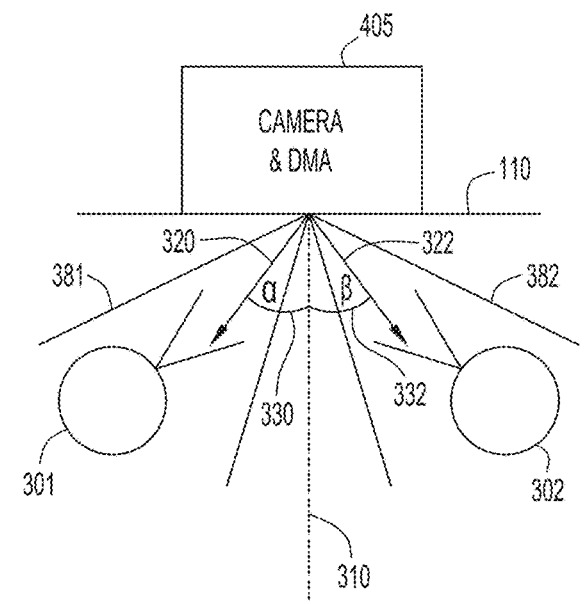
FIG. 4 shows a scenario in which stereo sound generation logic uses face detection information and a look direction of a beam of a microphone array to generate a stereo sound signal from at least one participant, according to an example embodiment.

FIG. 4 shows a scenario in which stereo sound generation logic 160 uses both face detection information and a look direction of a beam of a multi-microphone array, such as DMA 145, to generate a stereo sound signal 250 from at least one participant, according to an example embodiment.

As shown, participant 301 is located at an angle α 330 from an imaginary normal line 310 that extends outward from combination camera and DMA 405 of video conference endpoint device 110, and participant 302 is located at an angle ρ 332 from imaginary normal line 310. That is, a view direction 320 for participant 301, and a view direction 322 for participant 302 may be determined by face detection logic 210 and supplied to stereo sound generation logic 160.

In addition, participant 301, having a distinct frequency envelop or profile, and participant 302, having another distinct frequency envelop or profile, enables the DMA portion of combination camera and DMA 405 to configure respective sound receiving beams 381, 382 with look directions substantially corresponding, respectively, to view direction 320, and view direction 322. Sound receiving beams 381, 382 may be widened or narrowed depending on how far away participant 301 or participant 302 is from video conference endpoint device 110, and/or widened or narrowed or steered based on a pose of participant 301 or participant 302.

Based on view directions 320, 322 (and, optionally, other information supplied by face detection logic 210 such as distance and pose), and corresponding beam look directions that are configured to pick up and distinguish distinct voices (frequencies), stereo sound generation logic 160 processes sound from each beam individually as respective mono sound signals and weights respective stereo channels as described above except using, e.g., different, or different instances of, variable gain amplifiers 281, 282. Each resulting stereo sound signal for each beam is then mixed into stereo sound signal 250 that is transmitted to other endpoints (not shown). In this regard, reference may again be made to FIG. 2B, which further shows that left channel 251 may be summed with a left channel component 481 of, e.g., sound receiving beam 382, and right channel 252 may be summed with a right channel component 482 of, e.g., sound receiving beam 382, to generate an aggregated stereo sound signal that more naturally represents the sound in the vicinity of video conference endpoint device 110.

In other words, stereo sound generation logic 160 weights each channel of stereo sound signal 250 based on where each participant 301, 302 is located. For example, if face detection logic 210 indicates a participant is located centrally, along imaginary normal line 310, stereo sound generation logic 160 may be configured to mix sound received via DMA 145 with equal weights in left channel 251 and right channel 252. If, as shown in FIG. 4, participant 301 is far to the left, stereo sound generation logic 160 may weigh the stereo sound signal such that sound coming from sound receiving beam 381 is amplified more in left channel 251 than in right channel 252, and vice versa. The same processing is applicable to sound coming from participant 302.

Figure 5:
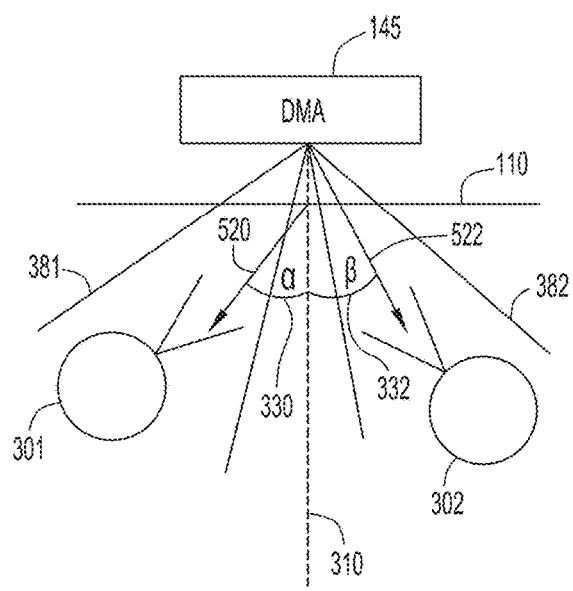
FIG. 5 shows a scenario in which stereo sound generation logic uses respective look directions of beams of a microphone array to generate a stereo sound signal for multiple participants, according to an example embodiment.

FIG. 5 shows a scenario in which stereo sound generation logic 160 uses respective static look directions of beams of a microphone array to generate a stereo sound signal for multiple participants, according to an example embodiment. That is, as shown in FIG. 5, participant 301 is located at an angle α 330 from an imaginary normal line 310 that extends outward from DMA 145 of video conference endpoint device 110, and participant 302 is located at an angle R 332 from imaginary normal line 310. Participant 301, having a distinct frequency envelop or profile, and participant 302, having another distinct frequency envelop or profile, enables DMA 145 to configure respective sound receiving beams 381, 382 with look directions 520, 522.

Based on look directions 520, 522, stereo sound generation logic 160 processes sound from each beam individually as respective mono sound signals and weights respective stereo channels as described above. Each resulting stereo sound signal for each beam is then mixed into stereo sound signal 250 that is transmitted to other endpoints (not shown). In this regard, reference may again be made to FIG. 2B, which further shows that left channel 251 may be summed with a left channel component 481 of, e.g., beam 382, and right channel 252 may be summed with a right channel component 482 of, e.g., beam 382 so as to generate an aggregated stereo sound signal that more naturally represents the sound in the vicinity of video conference endpoint device 110.

In other words, stereo sound generation logic 160 weights each channel of stereo sound signal 250 based on where each participant 301, 302 is located based on a look direction of sound receiving beams 381, 382, without additional information that could be supplied from face detection logic 210. This scenario may occur when, for example, participants 301, 302 may have chosen to disable camera 150, or when, perhaps, camera 150 is inoperable.

Thus, even if a remote endpoint does not provide a camera view from video conference endpoint device 110, the embodiment described herein can still facilitate distinguishing among different speakers based on their respective locations in front of video conference endpoint device 110 by generating an appropriate stereo signals that may be transmitted to a remote video conference endpoint.

Figure 6:
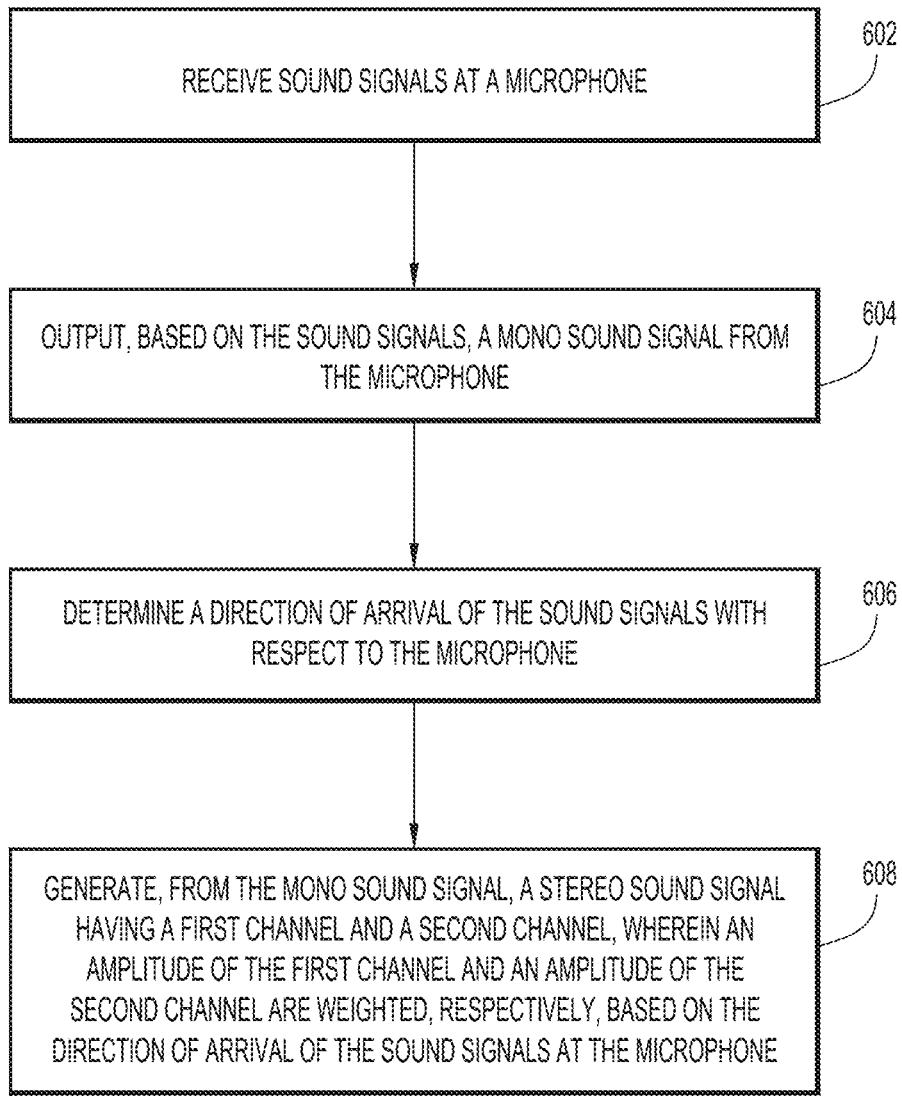
FIG. 6 is a flow chart depicting a series of operations for operating a video conference endpoint including stereo sound generation logic, according to an example embodiment.

FIG. 6 is a flow chart depicting a series of operations for operating a video conference endpoint including stereo sound generation logic, according to an example embodiment. As shown, at 602, an operation is configured to receive sound signals at a microphone. At 604, an operation is configured to output a mono sound signal from the microphone. At 606, an operation is configured to determine a direction of arrival of the sound signals with respect to the microphone. And at 608, an operation is configured to generate, from the mono audio signal, a stereo sound signal having a first channel and a second channel, wherein an amplitude of the first channel and an amplitude of the second channel are weighted, respectively, based on the direction of arrival of the sound signals at the microphone.

Figure 7:
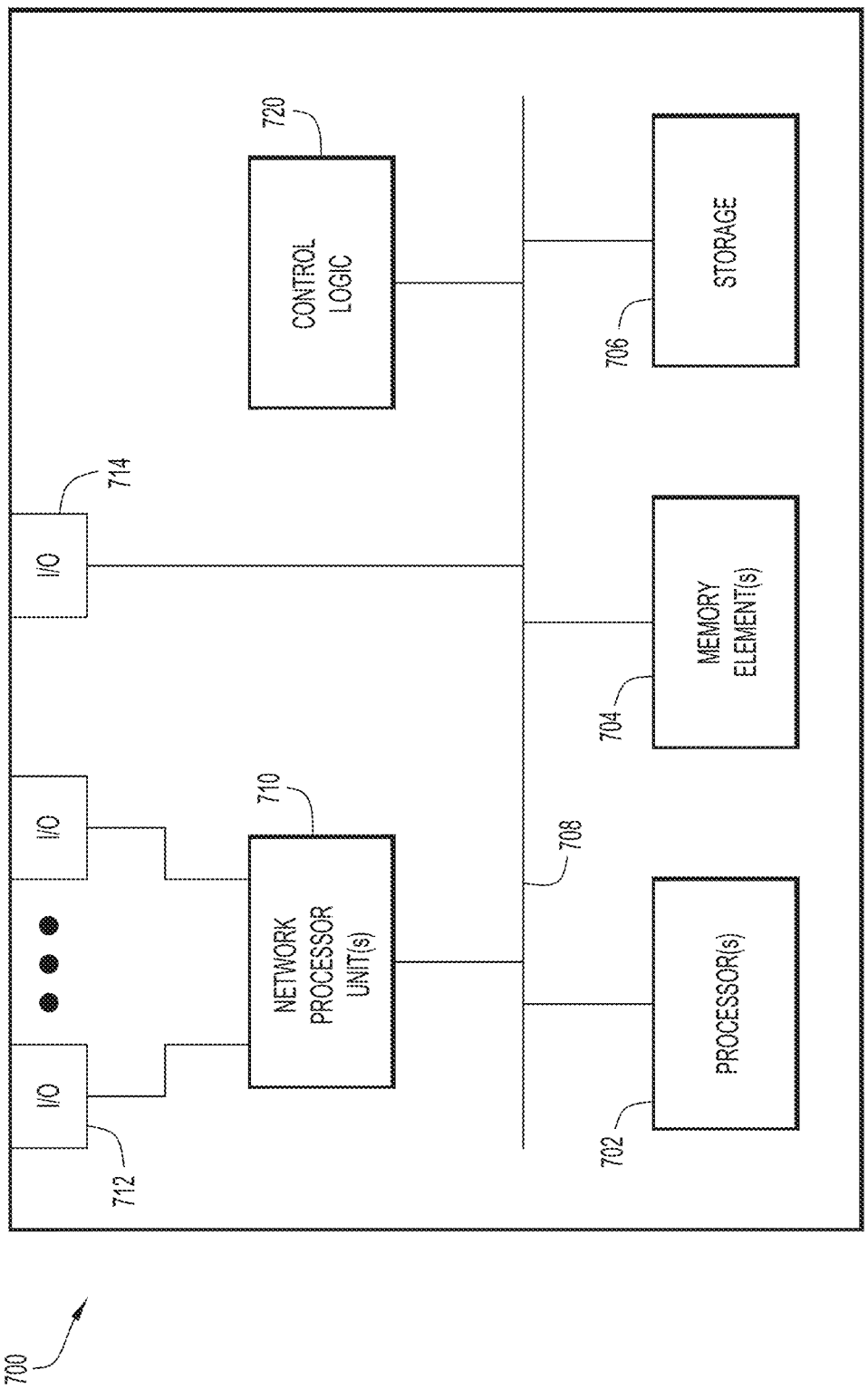
FIG. 7 is a block diagram of a device that may be configured as a video conference endpoint device that hosts stereo sound generation logic, and perform the techniques described herein, according to an example embodiment.

FIG. 7 illustrates a hardware block diagram of a computing device 700 that may perform functions associated with operations discussed herein in connection with the techniques depicted in FIGS. 1A, 1B and 2-6. In various embodiments, a computing device, such as computing device 700 or any combination of computing devices 700, may be configured as any entity/entities as discussed for the techniques depicted in connection with FIGS. 1A, 1B and 2-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720 (which could include, for example, stereo sound generation logic 160 or face detection logic 210). In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, in one embodiment, a method is provided. The method may include receiving sound signals at a microphone, outputting, based on the sound signals, a mono sound signal from the microphone, determining a direction of arrival of the sound signals with respect to the microphone, and generating, from the mono sound signal, a stereo sound signal having a first channel and a second channel, wherein an amplitude of the first channel and an amplitude of the second channel are weighted, respectively, based on the direction of arrival of the sound signals at the microphone.

In the method, determining the direction of arrival of the sound signals may include receiving the sound signals with a dual microphone array and distinguishing the sound signals based on frequency.

In the method, determining the direction of arrival of the sound signals may include detecting, with a camera, a face of a participant who is generating the sound signals.

In the method, determining the direction of arrival of the sound signals may further include considering a distance between the participant and the camera.

In the method, determining the direction of arrival of the sound signals may further include considering a pose of the face of the participant who is generating the sound signals.

The method may further include controlling a first variable gain amplifier and a second variable gain amplifier to generate the stereo sound signal for the first channel and the second channel, respectively.

In the method, the sound signals may be generated by at least two participants, and the method may include determining a first sound receiving beam look direction for a first participant of the at least two participants, and a second sound receiving beam look direction for a second participant of the at least two participants, and generating, from the mono sound signal, a first stereo sound signal based on sound received from the first sound receiving beam look direction and a second stereo sound signal based on sound received from the second sound receiving beam look direction.

The method may also include summing respective channels of the first stereo sound signal and the second stereo sound signal to obtain the stereo sound signal.

The method may further include detecting, with a camera, a face of a participant who is generating the sound signals, and adjusting a sound receiving beam of the microphone based on a location of the face of the participant.

In the method, the microphone may be part of an endpoint device for a video conference.

A device may also be provided. The device may include an interface configured to enable network communications, a memory, and one or more processors coupled to the interface and the memory, and configured to: receive sound signals at a microphone, output, based on the sound signals, a mono sound signal from the microphone, determine a direction of arrival of the sound signals with respect to the microphone, and generate, from the mono sound signal, a stereo sound signal having a first channel and a second channel, wherein an amplitude of the first channel and an amplitude of the second channel are weighted, respectively, based on the direction of arrival of the sound signals at the microphone.

In the device, the one or more processors may be further configured to determine the direction of arrival of the sound signals by receiving the sound signals with a dual microphone array.

In the device, the one or more processors may be further configured to determine the direction of arrival of the sound signals by detecting, with a camera, a face of a participant who is generating the sound signals.

In the device, the one or more processors may be further configured to determine the direction of arrival of the sound signals by considering a distance between the participant and the camera.

In the device, the one or more processors may be further configured to determine the direction of arrival of the sound signals by considering a pose of the face of the participant who is generating the sound signals.

In the device, the one or more processors may be further configured to control a first variable gain amplifier and a second variable gain amplifier to generate the stereo sound signal for the first channel and the second channel, respectively.

In the device, the sound signals may be generated by at least two participants, and the one or more processors may be further configured to: determine a first sound receiving beam look direction for a first participant of the at least two participants, and a second sound receiving beam look direction for a second participant of the at least two participants, and generate, from the mono sound signal, a first stereo sound signal based on sound received from the first sound receiving beam look direction and a second stereo sound signal based on sound received from the second sound receiving beam look direction.

In still another embodiment, one or more non-transitory computer readable storage media encoded with instructions are provided and, when executed by a processor, cause the processor to: receive sound signals at a microphone, output, based on the sound signals, a mono sound signal from the microphone, determine a direction of arrival of the sound signals with respect to the microphone, and generate, from the mono sound signal, a stereo sound signal having a first channel and a second channel, wherein an amplitude of the first channel and an amplitude of the second channel are weighted, respectively, based on the direction of arrival of the sound signals at the microphone.

The one or more non-transitory computer readable storage media may be further encoded with instructions that, when executed by a processor, cause the processor to: determine the direction of arrival of the sound signals by receiving the sound signals with a dual microphone array.

The one or more non-transitory computer readable storage media may be further encoded with instructions that, when executed by a processor, cause the processor to: determine the direction of arrival of the sound signals by detecting, with a camera, a face of a participant who is generating the sound signals.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
receiving sound signals at a microphone at an endpoint device;
outputting, based on the sound signals, a mono sound signal from the microphone;
determining a direction of arrival of the sound signals with respect to the microphone;
generating, from the mono sound signal and at the endpoint device, a stereo sound signal having a first channel and a second channel, wherein an amplitude of the first channel and an amplitude of the second channel are weighted, respectively, based on the direction of arrival of the sound signals at the microphone; and
transmitting the stereo sound signal to another endpoint device.

2. The method of claim 1, wherein determining the direction of arrival of the sound signals comprises receiving the sound signals with a dual microphone array and distinguishing the sound signals based on frequency.

3. The method of claim 1, wherein determining the direction of arrival of the sound signals comprises detecting, with a camera, a face of a participant who is generating the sound signals.

4. The method of claim 3, wherein determining the direction of arrival of the sound signals further comprises considering a distance between the participant and the camera.

5. The method of claim 3, wherein determining the direction of arrival of the sound signals further comprises considering a pose of the face of the participant who is generating the sound signals.

6. The method of claim 1, further comprising controlling a first variable gain amplifier and a second variable gain amplifier to generate the stereo sound signal for the first channel and the second channel, respectively.

7. The method of claim 1, wherein the sound signals are generated by at least two participants, and the method further comprises, determining a first sound receiving beam look direction for a first participant of the at least two participants, and a second sound receiving beam look direction for a second participant of the at least two participants; and
generating, from the mono sound signal, a first stereo sound signal based on sound received from the first sound receiving beam look direction and a second stereo sound signal based on sound received from the second sound receiving beam look direction.

8. The method of claim 7, further comprising summing respective channels of the first stereo sound signal and the second stereo sound signal to obtain the stereo sound signal.

9. The method of claim 1, further comprising detecting, with a camera, a face of a participant who is generating the sound signals, and adjusting a sound receiving beam of the microphone based on a location of the face of the participant.

10. The method of claim 1, wherein the microphone is part of an endpoint device for a video conference.

11. A device comprising:
an interface configured to enable network communications;
a memory; and
one or more processors coupled to the interface and the memory, and configured to:
receive sound signals at a microphone;
output, based on the sound signals, a mono sound signal from the microphone;
determine a direction of arrival of the sound signals with respect to the microphone;
generate, from the mono sound signal and at the device, a stereo sound signal having a first channel and a second channel, wherein an amplitude of the first channel and an amplitude of the second channel are weighted, respectively, based on the direction of arrival of the sound signals at the microphone; and
transmit the stereo sound signal to a remote endpoint device.

12. The device of claim 11, wherein the one or more processors are further configured to determine the direction of arrival of the sound signals by receiving the sound signals with a dual microphone array.

13. The device of claim 11, wherein the one or more processors are further configured to determine the direction of arrival of the sound signals by detecting, with a camera, a face of a participant who is generating the sound signals.

14. The device of claim 13, wherein the one or more processors are further configured to determine the direction of arrival of the sound signals by considering a distance between the participant and the camera.

15. The device of claim 13, wherein the one or more processors are further configured to determine the direction of arrival of the sound signals by considering a pose of the face of the participant who is generating the sound signals.

16. The device of claim 11, wherein the one or more processors are further configured to control a first variable gain amplifier and a second variable gain amplifier to generate the stereo sound signal for the first channel and the second channel, respectively.

17. The device of claim 11, wherein the sound signals are generated by at least two participants, and the one or more processors are further configured to:
determine a first sound receiving beam look direction for a first participant of the at least two participants, and a second sound receiving beam look direction for a second participant of the at least two participants; and
generate, from the mono sound signal, a first stereo sound signal based on sound received from the first sound receiving beam look direction and a second stereo sound signal based on sound received from the second sound receiving beam look direction.

18. One or more non-transitory computer readable storage media encoded with instructions that, when executed by a processor, cause the processor to:
receive sound signals at a microphone at an endpoint device;
output, based on the sound signals, a mono sound signal from the microphone;
determine a direction of arrival of the sound signals with respect to the microphone;
generate, from the mono sound signal and at the endpoint device, a stereo sound signal having a first channel and a second channel, wherein an amplitude of the first channel and an amplitude of the second channel are weighted, respectively, based on the direction of arrival of the sound signals at the microphone; and
transmit the stereo sound signal to another endpoint device.

19. The one or more non-transitory computer readable storage media of claim 18, further encoded with instructions that, when executed by a processor, cause the processor to:
determine the direction of arrival of the sound signals by receiving the sound signals with a dual microphone array.

20. The one or more non-transitory computer readable storage media of claim 18, further encoded with instructions that, when executed by a processor, cause the processor to:
determine the direction of arrival of the sound signals by detecting, with a camera, a face of a participant who is generating the sound signals.

* * * * *